United States Patent
Yan et al.

(10) Patent No.: US 10,219,258 B2
(45) Date of Patent: Feb. 26, 2019

(54) UPLINK SERVICE TRANSMISSION METHOD AND APPARATUS AND WIRELESS LOCAL AREA NETWORK ACCESS POINT

(71) Applicant: Huawei Technologies Co., Ltd., Shenzhen (CN)

(72) Inventors: Min Yan, Shenzhen (CN); Xin Xue, Shenzhen (CN); Le Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 8 days.

(21) Appl. No.: 15/483,811

(22) Filed: Apr. 10, 2017

(65) Prior Publication Data

US 2017/0215182 A1 Jul. 27, 2017

Related U.S. Application Data

(63) Continuation of application No. PCT/CN2014/088394, filed on Oct. 11, 2014.

(51) Int. Cl.
*H04W 72/04* (2009.01)
*H04L 5/00* (2006.01)
(Continued)

(52) U.S. Cl.
CPC ......... *H04W 72/0413* (2013.01); *H04L 5/001* (2013.01); *H04L 5/0048* (2013.01); *H04W 16/14* (2013.01); *H04W 88/08* (2013.01)

(58) Field of Classification Search
None
See application file for complete search history.

(56) References Cited

U.S. PATENT DOCUMENTS 8,270,435 B2 9/2012 Olszewski
2007/0259672 A1* 11/2007 Heo .................. H04W 72/042
455/452.2
(Continued)

FOREIGN PATENT DOCUMENTS

CN 101026577 A 8/2007
CN 101127576 A 2/2008
(Continued)

OTHER PUBLICATIONS

"Part 11: Wireless LAN Medium Access Control (MAC) and Physical Layer (PHY) Specifications—Amendment 4: Enhancements for Very High Throughput for Operation in Bands below 6 GHz",IEEE Std 802.11ac, Dec. 11, 2013, 425 pages.
(Continued)

Primary Examiner — Hong S Cho

(57) ABSTRACT

In an uplink service transmission method, an access point divides an entire channel into resource blocks according to a quantity of stations that are connected to the access point, then allocates, to each station according to channel estimation information of each station, a resource block used to transmit uplink information, and separately sends channel allocation indication information to each station, so that each station finds, according to the channel allocation indication information, the resource block corresponding to the station, and transmits the uplink information by using the resource block, so as to implement that in an OFDMA system, multiple stations transmit uplink information in parallel, that is, resource blocks that are obtained by means of division can be simultaneously applicable to multiple stations.

15 Claims, 3 Drawing Sheets

(51) Int. Cl.
*H04W 16/14* (2009.01)
*H04W 88/08* (2009.01)

(56) References Cited

U.S. PATENT DOCUMENTS

| | | | | |
|---|---|---|---|---|
| 2010/0061334 A1* | 3/2010 | Gault | ............... | H04L 5/0005 370/330 |
| 2010/0329199 A1* | 12/2010 | Liu | ............... | H04W 72/1226 370/329 |
| 2015/0304090 A1* | 10/2015 | Ko | ............... | H04B 7/024 370/329 |
| 2015/0351116 A1* | 12/2015 | Shoshan | ............ | H04B 7/15542 370/330 |
| 2016/0173306 A1* | 6/2016 | Hong | ............... | H04L 25/022 370/329 |

FOREIGN PATENT DOCUMENTS

| | | |
|---|---|---|
| CN | 101184318 A | 5/2008 |
| CN | 102045761 A | 5/2011 |

OTHER PUBLICATIONS

Deng Der-Jiunn et al., "IEEE 802.11ax: Next generation wireless local area Networks", 10th International Conference on Heterogeneous Networking for Quality, Reliability, Security and Robustness, ICST, Aug. 18, 2014, pp. 77-82, XP032664636.

Naftali Chayat et al., "Uplink OFDMA for FFT=256 mode-rationale and proposed set of parameters;BRAN28d080 [256 FFT OFDMA presentation", ETSI Draft; BRAN28D080 [256 FFT OFDMA Presentation], European Telecommunications Standards Institute (ETSI), 650, Route Des Lucioles; F-06921 Sophia-Antipolis; France, vol. BRAN, Sep. 12, 2002, pp. 1-29, XP014078618.

Jinsoo Choi et al., "Envisioning 11ax PHY Structure—Part I", doc.: IEEE 11-14/0804r1, Jul. 14, 2014, 12 pages, XP055229337.

Panyuh Joo et al., "Comment on Subchannelization for 256FFT UL-OFDMA", IEEE 802.16d-03/48, Jul. 24, 2003, 8 pages, XP017788891.

Jinyoung Chun et al., "Consideration on ULMU transmission", IEEE 11-14/0802r0, Jul. 14, 2014, 10 pages, XP068069534.

\* cited by examiner

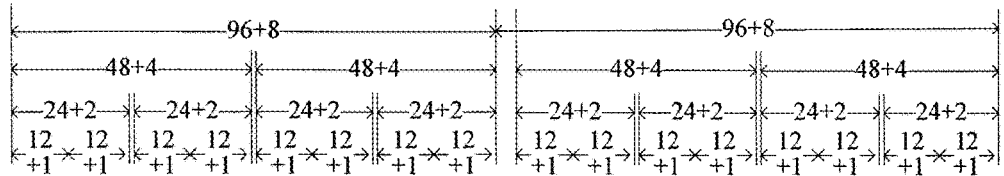
FIG. 3
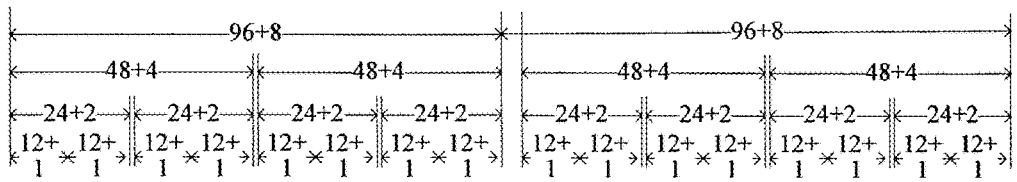
FIG. 4
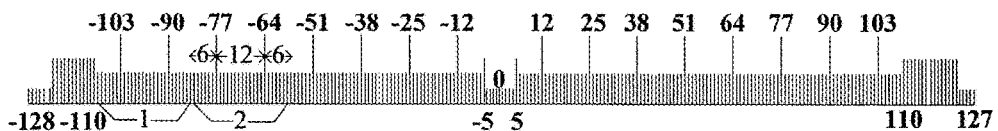
FIG. 5
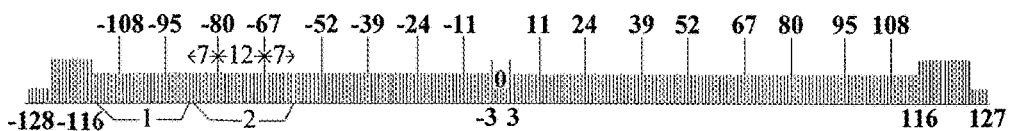
FIG. 6
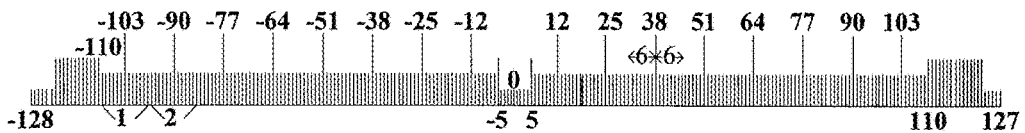
FIG. 7
| Frame Control | Duration | RA | TA | AID MAP | Sub-channel type | Sub-channel number | Total number of subchannel | FCS |
FIG. 8

UPLINK SERVICE TRANSMISSION METHOD AND APPARATUS AND WIRELESS LOCAL AREA NETWORK ACCESS POINT

CROSS-REFERENCE TO RELATED APPLICATIONS

This application is a continuation of International Application No. PCT/CN2014/088394, filed on Oct. 11, 2014, the disclosure of which is hereby incorporated by reference in its entirety.

TECHNICAL FIELD

The present invention relates to the field of communications technologies, and in particular, to an uplink service transmission method and apparatus and a wireless local area network access points that are in an OFDMA system.

BACKGROUND

Orthogonal Frequency Division Multiple Access (OFDMA) is a standard of a wireless communications system such as a cellular network system or a Wi-Fi system. An OFDMA system is to divide a transmission bandwidth into a series of subcarrier sets that are orthogonal and not overlapped, and allocate different subcarrier sets to different users, so as to implement multiple access.

With development and application of the Internet and wide popularization of portable sites such as smart phones, a higher requirement is made on channels of future data communication. In a highly dense application scenario, the current wireless local area network standard, namely, the IEEE802.11ac standard, cannot satisfy a requirement of a user on a data transmission rate. For a problem of the highly dense application scenario, a UL OFDMA (Up-Link Orthogonal Frequency Division Multiple Access) mechanism is first introduced in a wireless communications system, to increase a quantity of users for which transmission can be performed on a bandwidth simultaneously. However, after the UL OFDMA mechanism is introduced, a protocol of the wireless communications standard IEEE802.11ac is greatly changed. Therefore, a pilot structure of an existing spectrum and an allocation solution for a subcarrier need to be redesigned. Using a 20-MHz bandwidth as an example, the following problems of subcarrier allocation and pilot allocation need to be resolved. The problems are, for example, how many data subcarriers need to be allocated to one resource block (RB), how to set a pilot structure of each RB, how many users can be simultaneously connected on a bandwidth, and how to allocate resource blocks for each user.

SUMMARY

Embodiments of the present invention provide an uplink service transmission method and apparatus and a wireless local area network access point, so as to resolve a problem in the prior art that a wireless communications system cannot be applied to a highly dense application scenario.

To resolve the foregoing technical problem, the embodiments of the present invention disclose the following technical solutions:

According to a first aspect, the present invention provides an uplink service transmission method, where the method is applied to an orthogonal frequency division multiple access OFDMA system and the method includes:

dividing, by a wireless local area network access point according to a quantity of stations that are connected to the access point, an entire channel on which the access point is located into multiple resource blocks;

allocating, by the access point to each of the stations according to channel estimation information of the stations, a resource block for transmitting uplink information; and separately sending, by the access point, channel allocation indication information to each of the stations, where the channel allocation indication information is used to indicate information about the resource block allocated to each of the stations.

With reference to the first aspect, in a first possible implementation manner of the first aspect, the dividing, by a wireless local area network access point according to a quantity of stations that are connected to the access point, an entire channel on which the access point is located into multiple resource blocks includes:

determining, by the access point according to the quantity of the stations, a quantity of the resource blocks on the entire channel on which the access point is located;

evenly allocating, by the access point, data subcarriers to each of the resource blocks according to the quantity of the resource blocks and a quantity of the data subcarriers on the entire channel on which the access point is located, where a quantity of data subcarriers in 256 subcarriers included in a 20-MHz channel on which the access point is located includes 192, 208, or another preset quantity; and allocating, by the access point, a pilot to each of the resource blocks, where there are at least 12 data subcarriers between two adjacent pilots.

According to a second aspect, the present invention provides a wireless local area network access point, where the access point is applied to an orthogonal frequency division multiple access OFDMA system, and the access point includes a processor and a transmitter connected to the processor, where the processor is configured to: divide, according to a quantity of stations that are connected to the access point, an entire channel on which the access point is located into multiple resource blocks; and allocate, to each of the stations according to channel estimation information of each of the stations, a resource block for transmitting uplink information; and the transmitter is configured to separately send channel allocation indication information to each of the stations, where the channel allocation indication information is used to indicate information about the resource block allocated to each of the stations, so that each of the stations runs in parallel by using the resource block corresponding to each of the stations.

According to a third aspect, the present invention provides an uplink service transmission apparatus, where the apparatus is applied to an orthogonal frequency division multiple access OFDMA system and the apparatus includes:

a resource block division unit, configured to divide, according to a quantity of stations that are connected to the access point, an entire channel on which the access point is located into multiple resource blocks;

a resource block allocation unit, configured to allocate, to each of the stations according to channel estimation information of each of the stations, a resource block for transmitting uplink information; and a sending unit, configured to separately send channel allocation indication information to each of the stations, where the channel allocation indication information is used to indicate information about the resource block allocated to each of the stations, so that each of the stations runs in parallel by using the resource block corresponding to each of the stations.

As can be seen from the foregoing technical solutions, in the uplink service transmission method provided in the embodiments of the present invention, an access point divides an entire channel into resource blocks according to a quantity of stations that are connected to the access point, then allocates, to each station according to channel estimation information of each station, a resource block used to transmit uplink information, and separately sends channel allocation indication information to each station, so that each station finds, according to the channel allocation indication information, the resource block corresponding to the station, and transmits the uplink information by using the resource block, so as to implement that in an OFDMA system, multiple stations transmit uplink information in parallel, that is, resource blocks that are obtained by means of division can be simultaneously applicable to multiple stations. In conclusion, in the uplink service transmission method, a parameter of a resource block of a channel is determined according to a different quantity of stations, that is, a finally configured resource block can be simultaneously applicable to multiple stations, so that the multiple stations simultaneously transmit uplink information, thereby increasing a quantity of users that can access the channel.

BRIEF DESCRIPTION OF THE DRAWINGS

The accompanying drawings that constitute a part of the present invention are used to provide a further understanding of the present invention. Exemplary embodiments of the present invention and descriptions of the embodiments are used to describe the present invention, and do not constitute any inappropriate limitation to the present invention. In the accompanying drawings:

FIG. 3 is a schematic diagram of allocation of subcarriers and pilots of a resource block according to an embodiment of the present invention;

FIG. 4 is a schematic diagram of allocation of subcarriers and pilots of another resource block according to an embodiment of the present invention;

FIG. 5 is a schematic diagram of a spectral structure of a 20-MHz bandwidth according to an embodiment of the present invention;

FIG. 6 is a schematic diagram of a spectral structure of another 20-MHz bandwidth according to an embodiment of the present invention;

FIG. 7 is a schematic diagram of a spectral structure of still another 20-MHz bandwidth according to an embodiment of the present invention;

FIG. 8 is a schematic diagram of a message format of channel allocation indication information according to an embodiment of the present invention;

DETAILED DESCRIPTION

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
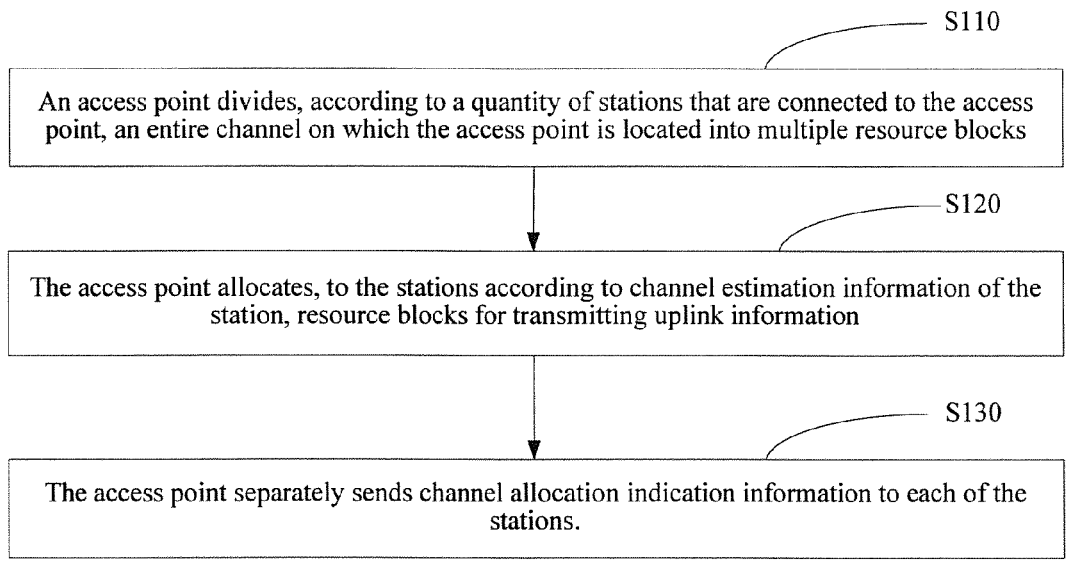
FIG. 1 is a schematic flowchart of an uplink service transmission method according to an embodiment of the present invention.

Referring to FIG. 1, FIG. 1 is a schematic flowchart of an uplink service transmission method according to an embodiment of the present invention. The method is applied to an access point of an OFDMA system.

It should be noted that the uplink service transmission method provided in the present invention is also applicable to a 40-MHz bandwidth channel, an 80-MHz bandwidth channel, or a 160-MHz bandwidth channel. For example, the 40-MHz bandwidth channel is divided into two 20-MHz bandwidth channels. The two 20-MHz bandwidth channels are both divided into resource blocks according to a spectral structure of a 20-MHz bandwidth. Similarly, for the 80-MHz bandwidth channel, the 80-MHz bandwidth channel is first divided into three 20-MHz bandwidth channels. The three 20-MHz bandwidth channels are then divided into resource blocks according to the spectral structure of the 20-MHz bandwidth. The 160-MHz bandwidth channel is divided into four 20-MHz bandwidth channels. The four 20-MHz bandwidth channels are divided into resource blocks according to the spectral structure of the 20-MHz bandwidth.

As shown in FIG. 1, the method includes the following steps:

S110: An access point divides, according to a quantity of stations that are connected to the access point, an entire channel on which the access point is located into multiple resource blocks.

The access point first needs to determine, according to the quantity of the stations that are connected to the access point, a quantity of the resource blocks into which the entire channel of the access point needs to be divided. The entire channel of the access point refers to an entire communications channel by using which the access point communicates with a station. For example, if the access point communicates, by using a 20-MHz bandwidth channel, with a station connected to the access point, the entire channel of the access point is the 20-MHz bandwidth channel.

When the entire channel is divided into resource blocks, a quantity of data subcarriers on the 20-MHz bandwidth channel is first determined according to a spectrum profile of a 20-MHz bandwidth and a coding and modulation scheme corresponding to a preset quantity of stations, and then the division of resource blocks is determined according to the quantity of the resource blocks and the quantity of the data subcarriers. A specific process of division into resource blocks is described in detail below, and is not described herein.

The data subcarrier is a subcarrier of all subcarriers included in the resource blocks that is used to transmit data.

S120: The access point allocates, to the stations according to channel estimation information of the stations, resource blocks for transmitting uplink information.

The access point can acquire channel estimation information of each station connected to the access point, and then determine, according to the channel estimation information of each station, the resource block that is of each station and that is used to transmit the uplink information, that is, a subchannel used to transmit the uplink information.

For example, when the quantity of the stations that are connected to the access point is 4, and the entire channel is divided into 8 resource blocks, 2 resource blocks that are allocated to each station and that is used to transmit the uplink information to the access point are determined by using the channel estimation information of each station.

S130: The access point separately sends channel allocation indication information to each of the stations.

The channel allocation indication information is used to indicate information about a resource block allocated to each of the stations, so that each of the stations runs in parallel by using the resource block corresponding to each of the stations.

After determining the resource block allocated to each station, the access point separately sends the channel allocation indication information to each station, and notifies, by using the channel allocation indication information, each station of the information about the resource block used to send the uplink information, for example, location information of the resource block.

The access point may send the channel allocation indication information to the station in a multicast manner.

In the uplink service transmission method provided in this embodiment of the present invention, an access point divides an entire channel into resource blocks according to a quantity of stations that are connected to the access point, then allocates, to each station according to channel estimation information of each station, a resource block used to transmit uplink information, and separately sends channel allocation indication information to each station, so that each station finds, according to the channel allocation indication information, the resource block corresponding to the station, and transmits the uplink information by using the resource block, so as to implement that in an OFDMA system, multiple stations transmit uplink information in parallel, that is, resource blocks that are obtained by means of division can be simultaneously applicable to multiple stations.

Figure 2:
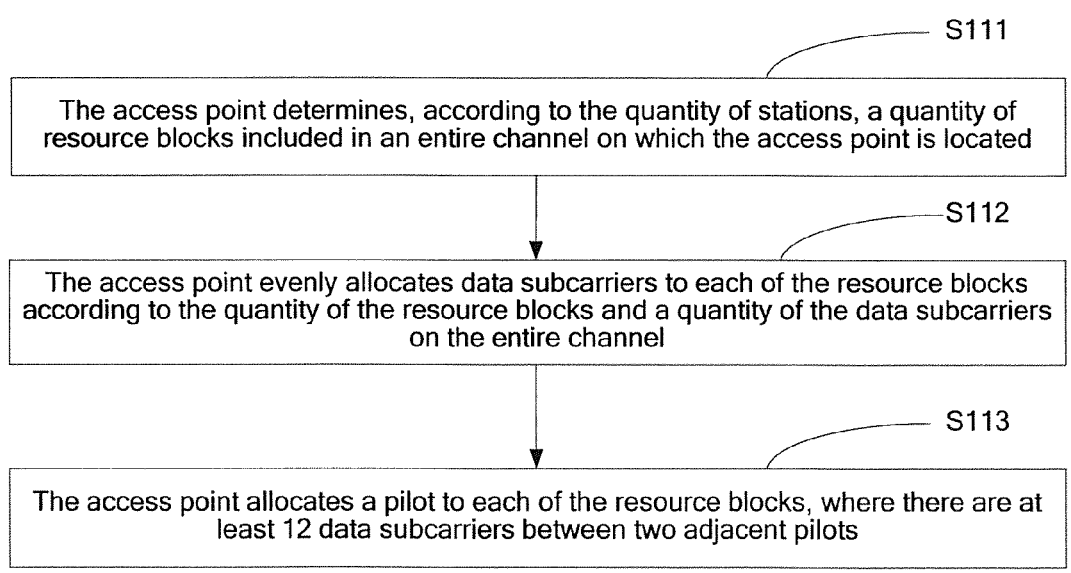
FIG. 2 is a schematic flowchart of a method of step S110 shown in FIG. 1 according to an embodiment of the present invention.

In an embodiment of the present invention, step S110 in FIG. 1 may be implemented by using a method procedure shown in FIG. 2. As shown in FIG. 2, the method may include S111 to S113:

S111: The access point determines, according to the quantity of the stations, a quantity of the resource blocks included in the entire channel on which the access point is located.

The access point determines the quantity of the resource blocks according to the quantity of the stations that are connected to the access point. For example, when the quantity of the stations is 8, the quantity of the resource blocks on the entire channel is 8 or 16; when the quantity of the stations is 4, the quantity of the resource blocks on the entire channel is 4, 8, or 16; and when the quantity of the stations is 2, the quantity of the resource blocks on the entire channel is 2, 4, 8, or 16.

In conclusion, the quantity of the resource blocks is an integer multiple of the quantity of the stations. Moreover, the quantity of the resource blocks is usually an even number. The quantity of the resource blocks may have four cases: 2, 4, 8, and 16. If the quantity of the stations is an odd number, a value greater than the quantity of the stations is selected from 2 resource blocks, 4 resource blocks, 8 resource blocks, or 16 resource blocks as the quantity of the resource blocks. For example, the quantity of the stations is 3, the entire channel may be divided into 4 resource blocks, 8 resource blocks, or 16 resource blocks.

In specific implementation, several possible quantities of the resource blocks into which a 20-MHz bandwidth channel may be divided are determined, and then the quantity of the resource blocks applicable to the quantity of the stations is selected from the pre-determined possible quantities of the resource blocks according to the quantity of the stations that simultaneously connected to the 20-MHz bandwidth channel.

S112: The access point evenly allocates data subcarriers to each of the resource blocks according to the quantity of the resource blocks and a quantity of the data subcarriers on the entire channel, where a quantity of data subcarriers in 256 subcarriers included in a 20-MHz channel on which the access point is located includes 192, 208, or another preset quantity.

A process of determining the quantity of the data subcarriers on the entire channel is described by using the 20-MHz bandwidth channel as an example below:

In this embodiment, the 20-MHz bandwidth channel is used as an example for description. An FFT of 256 points is used, that is, the 20-MHz bandwidth channel is divided into 256 subcarriers, and an example in which subcarrier spacing is 78.5 KHz is used for calculation. To be compatible with the IEEE802.11 standard, in this embodiment of the present invention, a 20-MHz spectrum profile specified in the IEEE802.11 standard is used, where a transitive bandwidth is 2500 KHz, and a bandwidth at the middle zero frequency location is 650 KHz.

If the subcarrier spacing is 78.5 KHz, the 2500-KHz transitive bandwidth includes 31 subcarriers. A subcarrier at the transitive bandwidth is not used to transmit data, and therefore, is referred to as an empty subcarrier. The bandwidth at the middle 650-KHz zero frequency location includes 7 subcarriers, and a subcarrier at the zero frequency location is a direct current subcarrier, and is also referred to as a zero subcarrier.

To avoid increasing overheads of the pilot (that is, overheads of the pilot), a maximum quantity of pilots, that is, 16, which is used in the IEEE802.11ac standard continues to be used, where the pilot is used to estimate a phase of a channel and is a fixed sequence. In this way, the quantity of the data subcarriers that can be used in data transmission on the 20-MHz bandwidth channel is 256−31−7−16=202.

Different quantities of stations correspond to different MCSs (Modulation and Coding Scheme, modulation and coding scheme). Considering a problem of compatibility of the MCSs of multiple stations, the quantity of the data subcarriers used to transmit data is finally determined with reference to MCSs of 2 stations, 4 stations, and 8 stations. MCSs of 3 stations, 5 stations, 6 stations, or 7 stations are separately the same as the MCSs of 2 stations, 4 stations, and 8 stations, so that the finally determined quantity of the data subcarriers can be simultaneously applicable to the MCSs of 2 to 8 stations.

When the quantity of the data subcarriers is 202, the quantity of the data subcarriers is applicable to a 2-station scenario, but is inapplicable to a 4-station scenario and an 8-station scenario. When the quantity of the data subcarriers is 200, the quantity of the data subcarriers is applicable to the 2-station scenario and the 4-station scenario, but is inapplicable to the 8-station scenario. When the quantity of the data subcarriers is 198, the quantity of the data subcarriers is applicable to the 2-station scenario, but is inapplicable to the 4-station scenario and the 8-station scenario. When the quantity of the data subcarriers is 196, the quantity of the data subcarriers is applicable to the 2-station scenario and the 4-station scenario, but is inapplicable to the 8-station scenario. When the quantity of the data subcarriers is 194, the quantity of the data subcarriers is applicable to the 2-station scenario, but is inapplicable to the 4-station scenario and the 8-station scenario. When the quantity of the data subcarriers is 192, the quantity of the data subcarriers is applicable to the 2-station scenario, the 4-station scenario, and the 8-station scenario. Therefore, in this embodiment, it is finally determined that there are 192 data subcarriers on the 20-MHz channel.

When the quantity of the data subcarriers on the 20-MHz channel is 192, a total quantity of the empty subcarriers at two ends of the spectrum and the middle zero subcarriers is 256−192−16=48. To ensure symmetry of the spectrum, the quantity of the middle zero subcarriers may be 7, 9, or 11. When the quantity of the zero subcarriers is 7, the quantities of the empty subcarriers at the two ends are respectively 20 and 21. When the quantity of the zero subcarriers is 9, the quantities of the empty subcarriers at the two ends are respectively 19 and 20. When the quantity of the zero subcarriers is 11, the quantities of the empty subcarriers at the two ends are respectively 18 and 19.

In another embodiment of the present invention, to further improve utilization of a spectrum, the quantity of the empty subcarriers may be decreased within a range allowed by a spectrum profile of a 20-MHz bandwidth, and the quantity of the middle zero subcarriers is still 7. Considering that the MCSs of 2 stations, 4 stations, and 8 stations are all compatible, the quantity of the data subcarriers may be increased to 208. In this way, the quantities of the empty subcarriers at the two ends are respectively 12 and 13.

After the quantity of the data subcarriers on the 20-MHz bandwidth channel is determined, the quantity of the data subcarriers and the quantity of the resource blocks are further, the quantity of the data subcarriers included in each resource block is determined, and make sure that the quantity of the data subcarriers included in each resource block is equal. Allocation of the data subcarriers included in each resource block is separately:

(1) The quantity of the data subcarriers on the 20-MHz bandwidth channel is 192.

When a 20-MHz spectrum includes 2 resource blocks, each resource block includes 96 adjacent data subcarriers; when a 20-MHz spectrum includes 4 resource blocks, each resource block includes 48 adjacent data subcarriers; when a 20-MHz spectrum includes 8 resource blocks, each resource block includes 24 adjacent data subcarriers; or when a 20-MHz spectrum includes 16 resource blocks, each resource block includes 12 adjacent data subcarriers.

(2) The quantity of the data subcarriers on the 20-MHz bandwidth channel is 208.

When a 20-MHz spectrum includes 2 resource blocks, each resource block includes 104 adjacent data subcarriers; when a 20-MHz spectrum includes 4 resource blocks, each resource block includes 52 adjacent data subcarriers; when a 20-MHz spectrum includes 8 resource blocks, each resource block includes 26 adjacent data subcarriers; or when a 20-MHz spectrum includes 16 resource blocks, each resource block includes 13 adjacent data subcarriers.

S113: The access point allocates a pilot to each of the resource blocks, where there are at least 12 data subcarriers between two adjacent pilots.

It is specified in the IEEE802.11ac standard that a maximum quantity of pilots is 16, and in a 20-MHz bandwidth spectrum, a quantity of the spectrums may be less than 16. For example, when there are 2 stations, 8 pilots may be configured.

An example in which 16 pilots are configured is used below. If the quantity of the resource blocks is 16, 1 pilot is configured for each of the resource blocks; if the quantity of the resource blocks is 8, 2 pilots are configured for each of the resource blocks; if the quantity of the resource blocks is 4, 4 pilots are configured for each of the resource blocks; or if the quantity of the resource blocks is 2, 8 pilots may be configured for each of the resource blocks.

Referring to FIG. 3, FIG. 3 is a schematic diagram of allocation of data subcarriers and pilots of a resource block according to an embodiment of the present invention. In this embodiment, a 20-MHz bandwidth channel includes 192 data subcarriers and 16 pilots. As shown in FIG. 3, the following allocation manners are included:

When a quantity of the resource blocks is 2, each resource block includes 96 data subcarriers and 8 pilots; when a quantity of the resource blocks is 4, each resource block includes 48 data subcarriers and 4 pilots; when a quantity of the resource blocks is 8, each resource block includes 24 data subcarriers and 2 pilots; or when a quantity of the resource blocks is 16, each resource block includes 12 data subcarriers and 1 pilot.

Referring to FIG. 4, FIG. 4 is a schematic diagram of allocation of data subcarriers and pilots of another resource block according to an embodiment of the present invention. In this embodiment, a 20-MHz bandwidth channel includes 208 data subcarriers and 16 pilots. As shown in FIG. 3, the following allocation manners are included:

When a quantity of the resource blocks is 2, each resource block includes 104 data subcarriers and 8 pilots; when a quantity of the resource blocks is 4, each resource block includes 52 data subcarriers and 4 pilots; when a quantity of the resource blocks is 8, each resource block includes 26 data subcarriers and 2 pilots; or when a quantity of the resource blocks is 16, each resource block includes 13 data subcarriers and 1 pilot.

After a quantity of pilots that are allocated to each resource block is determined, a specific location of a pilot in each resource block is further determined. Considering coherence of channels, when there are at least 12 data subcarriers between two adjacent pilots, coherence between 2 channels is relatively low.

For example, when a quantity of the resource blocks is 16, 1 pilot is allocated to each resource block, and each of the resource blocks includes 12 data subcarriers, the access point configures a pilot between the resource blocks, where 6 data subcarriers are set on each of two sides of the pilot.

For example, when the quantity of the resource blocks is 8, each of the resource blocks includes 24 data subcarriers, and 2 pilots are allocated to each resource block, the 2 pilots are respectively a first pilot and a second pilot. Twelve data subcarriers are set between the first pilot and the second pilot. Six data subcarriers are set on a side that is of the first pilot and that is far away from the second pilot. Six data subcarriers are set on a side that is of the second pilot and that is far away from the first pilot.

For example, when the quantity of the resource blocks is 8, each of the resource blocks includes 26 data subcarriers, and 2 pilots are allocated to each resource block, the 2 pilots are respectively a third pilot and a fourth pilot. Twelve data subcarriers are set between the third pilot and the fourth pilot. Seven data subcarriers are set on a side that is of the third pilot and that is far away from the fourth pilot. Seven data subcarriers are set on a side that is of the fourth pilot and that is far away from the third pilot. Alternatively, 14 data subcarriers are set between the third pilot and the fourth pilot, 6 data subcarriers are set on a side that is of the third pilot and that is far away from the fourth pilot, and 6 data subcarriers are set on a side that is of the fourth pilot and that is far away from the third pilot.

In the uplink service transmission method provided in this embodiment of the present invention, a parameter of a resource block of a channel is determined according to different quantities of stations, that is, a finally configured resource block can be applicable to multiple stations, so as to implement that multiple stations simultaneously transmit uplink information. Moreover, the spectrum provided in this embodiment of the present invention can be applicable to an MCS table corresponding to 1 to 8 stations, and therefore, division into resource blocks can be flexibly performed according to the quantity of the stations. However, an existing spectrum is merely applicable to an MCS table corresponding to one quantity of the stations, for example, merely applicable to an MCS table corresponding to 2 stations or 3 stations.

Referring to FIG. 5, FIG. 5 is a schematic diagram of a spectral structure of a 20-MHz bandwidth obtained by using the method shown in FIG. 1. As shown in FIG. 5, a spectrum of each 20-MHz bandwidth channel includes 256 subcarriers, and there is no empty subcarrier between adjacent resource blocks.

The spectrum of each 20-MHz bandwidth channel includes 192 data subcarriers, and there are 11 zero subcarriers at a middle zero frequency location. There are totally 37 empty subcarriers set at two ends, where there are 19 at one end and 18 at the other end.

The 192 data subcarriers are evenly divided into 8 resource blocks, and each resource block includes 24 data subcarriers. Two pilots are allocated to each resource block. For example, in a resource block 1, the frequency channel number-103 and the frequency channel number-90 are pilots of the resource block. There are at least 12 data subcarriers between two adjacent pilots in a spectrum.

Preferably, to enable an access point to flexibly allocate a resource block when the access point schedules the resource block, the resource block is designed to be a symmetrical structure. As shown in FIG. 5, 2 pilots in each resource block are symmetrical about a middle location of the resource block. Assuming that each resource block includes a first pilot (for example, the frequency channel number-77 in a resource block 2) and a second pilot (for example, the frequency channel number-64 in a resource block 2), and 12 data subcarriers are set between the first pilot and the second pilot, 6 data subcarriers are set on a side that is of the first pilot and that is far away from the second pilot, and 6 data subcarriers are set on a side that is of the second pilot and that is far away from the first pilot.

FIG. 6 is a schematic structural diagram of a spectrum of another 20-MHz bandwidth channel obtained by using the method shown in FIG. 1. As shown in FIG. 6, a spectrum of each 20-MHz bandwidth channel includes 256 subcarriers, and there is no empty subcarrier between adjacent resource blocks.

To further improve utilization of a subcarrier, a quantity of the data subcarriers included in each 20-MHz bandwidth channel is increased to 208, which includes 7 zero subcarriers and 25 empty subcarriers, where 13 empty subcarriers are at one end and 12 empty subcarriers are on the other end.

The 208 data subcarriers are evenly divided into 8 resource blocks, and each resource block includes 26 data subcarriers. Two pilots are allocated to each resource block.

For example, in a resource block 1, the frequency channel number-108 and the frequency channel number-95 are pilots of the resource block. There are at least 12 data subcarriers between two adjacent pilots in a spectrum, 7 data subcarriers are set on a side that is a first pilot (the frequency channel number-108) and that is far away from a second pilot (the frequency channel number-95), and 7 data subcarriers are set on a side that is of the second pilot and that is far away from the first pilot. In a resource block 2, the frequency channel number-80 and the frequency channel number-67 are pilots of the resource block, and there are 12 data subcarriers between the 2 pilots.

Preferably, to enable an access point to flexibly allocate a resource block when the access point schedules the resource block, the resource block is designed to be a symmetrical structure.

According to the spectral structure provided in this embodiment, the quantity of the data subcarriers in each resource block is increased to 26, thereby improving spectrum utilization.

Referring to FIG. 7, FIG. 7 is a schematic diagram of a spectral structure of a 20-MHz bandwidth obtained by using the method shown in FIG. 1. As shown in FIG. 7, each 20-MHz bandwidth channel includes 256 subcarriers, and there is no empty subcarrier between adjacent resource blocks.

Each 20-MHz bandwidth channel includes 192 data subcarriers, zero subcarriers, and 37 empty subcarriers, where 19 empty subcarriers are at one end and 18 empty subcarriers at the other end.

The 192 data subcarriers are evenly divided into 16 resource blocks, and each resource block includes 12 data subcarriers. One pilot is allocated to each resource block. For example, in a resource block 1, the frequency channel number-103 is a pilot of the resource block, and in a resource block 2, the frequency channel number-90 is a pilot of the resource block. There are at least 12 data subcarriers between two adjacent pilots in a spectrum. In each resource block, quantities of data subcarriers on both sides of a pilot are 6, and there are 12 data subcarriers between two adjacent pilots.

After specific division of the 20-MHz bandwidth channel into resource blocks is determined, an access point allocates the resource blocks to each station.

In the embodiment shown in FIG. 1, when the access point allocates, to each station, a resource block for transmitting the uplink information, step (11) to step (13) may be used for implementation:

Step (11): The access point determines, according to a signal to noise ratio of a station, a quantity of pilots that are needed by the station to transmit the uplink information.

When the signal to noise ratio of the station is less than a preset value, the access point determines that at least 4 pilots are needed by each station to transmit data, where the preset value may be set according to an actual situation.

When the signal to noise ratio of the station is not less than a preset value, the access point determines that at least 2 pilots are needed by each station to transmit data.

Step (12): The access point determines, according to a quantity of pilots that are needed by each of the stations and a quantity of pilots included in the resource block, a target quantity of resource blocks that are needed by each of the stations.

A total quantity of pilots included in the resource block allocated to each station is not less than a quantity of pilots that are needed by the station to transmit data, and a total quantity of resource blocks that are allocated to all stations of the channel is equal to a total quantity of resource blocks included in the channel.

Step (13): The access point allocates the target quantity of resource blocks to each of the stations.

When the signal to noise ratio used when the station transmits data is less than the preset value, each station needs 4 pilots. According to the spectral structure shown in FIG. 5 or FIG. 6, at most 4 stations are allowed to be simultaneously connected to the 20-MHz bandwidth channel. In this case, the access point may allocate 2 resource blocks to each station according to channel estimation information of each station. According to the spectral structure shown in FIG. 7, at most 4 stations are allowed to be simultaneously connected to the 20-MHz bandwidth channel. In this case, the access point may allocate 2 resource blocks to each station according to the channel estimation information of each station.

Certainly, the subcarrier allocation shown in FIG. 5 and FIG. 6 is also applicable to a 2-station scenario or a 3-station scenario. The resource block may be flexibly allocated to each station, as long as a total quantity of pilots included in the resource block allocated to each station is ensured to be not less than 4, and a total quantity of the resource blocks allocated to each station is equal to a quantity of the resource blocks included in the 20-MHz bandwidth channel.

For example, when the subcarrier allocation is applied to the 2-station scenario, 4 resource blocks are flexibly allocated to each station; or 5 resource blocks are allocated to one of the stations, and 3 resource blocks are allocated to the other station; or 6 resource blocks are allocated to one of the stations, and 2 resource blocks are allocated to the other station.

When the subcarrier allocation is applied to the 3-station scenario, 3 resource blocks are separately allocated to 2 stations, and 2 resource blocks are allocated to the rest one station; or 2 resource blocks are separately allocated to 2 stations, and 4 resource blocks are allocated to the rest one station.

Similarly, the subcarrier allocation shown in FIG. 7 is also applicable to the 2-station scenario or the 3-station scenario. The resource blocks may be flexibly allocated to each station according to the foregoing principles. Details are not described herein again.

When the signal to noise ratio used when the station transmits data is greater than the preset value, each station may need only 2 pilots. In this way, according to the spectral structure shown in FIG. 5 or FIG. 6, at most 8 stations may be allowed to be simultaneously connected to the 20-MHz bandwidth channel. In this case, the access point may allocate one resource block to each station according to the channel estimation information of each station.

According to the spectral structure shown in FIG. 7, at most 8 stations are allowed to be simultaneously connected to the channel. In this case, the access point may allocate 2 resource blocks to each station according to an environment of the channel.

Referring to FIG. 8, FIG. 8 is a schematic diagram of a message format of channel allocation indication information according to an embodiment of the present invention. As shown in FIG. 8, the channel allocation indication information includes: a frame control (control field), a duration (duration) field, an RA (receiver address) field, a TA (Transmitter Address) field, and an AID MAP (association identifier map) field, a sub-channel type field, a sub-channel number field, a total number of sub-channels field, and an FCS (frame check sequence) field.

The AID MAP field is used to store an AID of a station sending the uplink information.

The sub-channel type field is used to represent a quantity of subchannels (that is, the resource blocks) obtained by dividing the 20-MHz channel, and is represented by using 2 a binary number. For example, a binary number 00 represents that a 20-MHz subchannel is divided into 2 resource blocks, and a bandwidth of each resource block is 10 MHz; a binary number 01 represents that a 20-MHz subchannel is divided into 4 resource blocks, and a bandwidth of each resource block is 5 MHz; a binary number 10 represents that a 20-MHz subchannel is divided into 8 resource blocks, and a bandwidth of each resource block is 2.5 MHz; and a binary number 11 represents that a 20-MHz subchannel is divided into 16 resource blocks, and a bandwidth of each resource block is 1.25 MHz.

The sub-channel number field is used to represent a number of a resource block allocated to the station, and is represented by using 16 bits. For example, a binary number 0000 represents that the number of the resource block is 1, a binary number 0001 represents that the number of the resource block is 2, and the rest can be deduced by analogy. A binary number 0111 represent the $8^{th}$ resource block, and a binary number 1111 represent the $16^{th}$ resource block. 16 bits may represent numbers of 4 resource blocks, that is, this format determines that at most 4 resource blocks may be allocated to each station. For example, binary numbers 0000, 1000, 0010, 0011 and represent that the numbers of the resource blocks used by the station are sequentially 1, 9, 3, and 4, the four resource blocks.

The total number of sub-channels field represents a quantity of the resource blocks allocated to the station. For example, a binary number 000001 represents that 1 resource block is allocated.

Content of the sub-channel number field and content of the total number of sub-channels field that are in the channel allocation indication information together represent a specific location of the resource block allocated to the station.

Corresponding to the embodiment of the uplink service transmission method applied to the OFDMA system, the present invention further provides an embodiment of an uplink service transmission apparatus applied to the OFDMA system.

Figure 9:
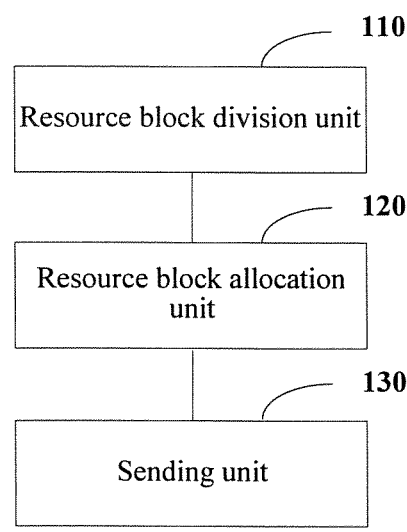
FIG. 9 is a block diagram of an uplink service transmission apparatus according to an embodiment of the present invention.

Referring to FIG. 9, FIG. 9 is a block diagram of an uplink service transmission apparatus according to an embodiment of the present invention. As shown in FIG. 9, the apparatus may include: a resource block division unit 110, a resource block allocation unit 120, and a sending unit 130.

The resource block division unit 110 is configured to divide, according to a quantity of stations that are connected to an access point, an entire channel on which the access point is located into multiple resource blocks.

In an embodiment of the present invention, the resource block division unit includes: a resource block quantity determining subunit, a data subcarrier allocation subunit, and a pilot allocation subunit.

The resource block quantity determining subunit is configured to determine, according to the quantity of the stations, a quantity of the resource blocks on the entire channel on which the access point is located.

When the quantity of the stations is 8, the quantity of the resource blocks on the entire channel on which the access point is located is 8 or 16; when the quantity of the stations is 4, the quantity of the resource blocks on the entire channel on which the access point is located is 4, 8, or 16; or when the quantity of the stations is 2, the quantity of the resource blocks on the entire channel on which the access point is located is 2, 4, 8, or 16.

The data subcarrier allocation subunit is configured to evenly allocate data subcarriers to each of the resource blocks according to the quantity of the resource blocks and a quantity of the data subcarriers on the entire channel on which the access point is located, where a quantity of data subcarriers in 256 subcarriers included in a 20-MHz channel on which the access point is located includes 192, 208, or another preset quantity.

When each 20-MHz bandwidth channel includes 192 data subcarriers: when the quantity of the resource blocks is 16, 12 adjacent data subcarriers are allocated to each of the resource blocks; when the quantity of the resource blocks is 8, 24 adjacent data subcarriers are allocated to each of the resource blocks; when the quantity of the resource blocks is 4, 48 adjacent data subcarriers are allocated to each of the resource blocks; or when the quantity of the resource blocks is 2, 96 adjacent data subcarriers are allocated to each of the resource blocks.

When each 20-MHz bandwidth channel includes 208 data subcarriers: when the quantity of the resource blocks is 16, 13 adjacent data subcarriers are allocated to each of the resource blocks; when the quantity of the resource blocks is 8, 26 adjacent data subcarriers are allocated to each of the resource blocks; when the quantity of the resource blocks is 4, 52 adjacent data subcarriers are allocated to each of the resource blocks; or when the quantity of the resource blocks is 2, 104 adjacent data subcarriers are allocated to each of the resource blocks.

The pilot allocation subunit is configured to allocate a pilot to each of the resource blocks, where there are at least 12 data subcarriers between two adjacent pilots.

First, a quantity of pilots included in each resource block is determined. When the quantity of the resource blocks is 16, 1 pilot is allocated to each of the resource blocks; when the quantity of the resource blocks is 8, 2 pilots are allocated to each of the resource blocks; when the quantity of the resource blocks is 4, 4 pilots are allocated to each of the resource blocks; or when the quantity of the resource blocks is 2, 8 pilots are allocated to each of the resource blocks.

After the quantity of pilots included in each resource block is determined, a location of a pilot in each resource block is further determined. When each of the resource blocks includes 12 data subcarriers, the access point configures a pilot between the resource blocks, where 6 data subcarriers are set on each of two sides of the pilot.

When each of the resource blocks includes 24 data subcarriers, the access point configures a first pilot and a second pilot, where 12 data subcarriers are set between the first pilot and the second pilot, 6 data subcarriers are set on a side that is of the first pilot and that is far away from the second pilot, and 6 data subcarriers are set on a side that is of the second pilot and that is far away from the first pilot.

When each of the resource blocks includes 26 data subcarriers, the access point configures a third pilot and a fourth pilot, where 12 data subcarriers are set between the third pilot and the fourth pilot, 7 data subcarriers are set on a side that is of the third pilot and that is far away from the fourth pilot, and 7 data subcarriers are set on a side that is of the fourth pilot and that is far away from the third pilot.

The resource block allocation unit 120 is configured to allocate, to each of the stations according to channel estimation information of each of the stations, a resource block for transmitting uplink information.

In an embodiment of the present invention, the resource block allocation unit includes: a first determining subunit, a second determining subunit, and an allocation subunit.

The first determining subunit is configured to determine, according to a signal to noise ratio of a station, a quantity of pilots that are needed by the station to transmit the uplink information.

When the signal to noise ratio of the station is less than a preset value, the access point determines that at least 4 pilots are needed by each station to transmit data.

When the signal to noise ratio of the station is not less than a preset value, the access point determines that at least 2 pilots are needed by each station to transmit data.

The second determining subunit is configured to determine, according to a quantity of pilots that are needed by each of the stations and a quantity of pilots included in the resource block, a target quantity of resource blocks that are needed by each of the stations.

A total quantity of pilots included in the resource block allocated to each station is not less than a quantity of pilots that are needed by the station to transmit data, and a total quantity of resource blocks that are allocated to all stations of the channel is equal to a total quantity of resource blocks included in the channel.

The allocation subunit is configured to allocate the target quantity of resource blocks to each of the stations.

The sending unit 130 is configured to separately send channel allocation indication information to each of the stations, where the channel allocation indication information is used to indicate information about the resource block allocated to each of the stations, so that each of the stations runs in parallel by using the resource block corresponding to each of the stations.

For the uplink service transmission apparatus provided in this embodiment of the present invention, an access point divides an entire channel into resource blocks according to a quantity of stations that are connected to the access point, then allocates, to each station according to channel estimation information of each station, a resource block used to transmit uplink information, and separately sends channel allocation indication information to each station, so that each station finds, according to the channel allocation indication information, a resource block corresponding to the station, and transmits the uplink information by using the resource block, so as to implement that in an OFDMA system, multiple stations transmit uplink information in parallel, that is, resource blocks that are obtained by means of division can be simultaneously applicable to multiple stations.

Corresponding to the foregoing embodiment of the uplink service transmission apparatus, the present invention further provides a wireless local area network access point.

Figure 10:
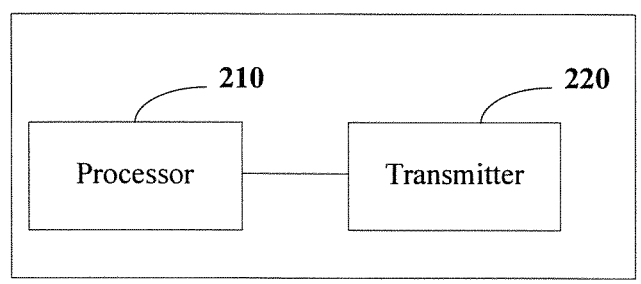
FIG. 10 is a block diagram of a wireless local area network access point according to an embodiment of the present invention.

Referring to FIG. 10, FIG. 10 is a block diagram of a wireless local area network access point according to an embodiment of the present invention. As shown in FIG. 10, the access point includes a processor 210 and a transmitter 220, where the processor 210 is connected to the transmitter 220.

The processor 210 is configured to: divide, according to a quantity of stations that are connected to the access point, an entire channel on which the access point is located into multiple resource blocks.

The processor is specifically configured to: determine, according to the quantity of the stations, a quantity of the resource blocks on the entire channel on which the access point is located; evenly allocate data subcarriers to each of the resource blocks according to the quantity of the resource blocks and a quantity of the data subcarriers on the entire channel on which the access point is located, where a quantity of data subcarriers in 256 subcarriers included in a 20-MHz channel on which the access point is located includes 192, 208, or another preset quantity; and allocate a pilot to each of the resource blocks, where there are at least 12 data subcarriers between two adjacent pilots.

The quantity of the resource blocks is determined according to the quantity of the stations: When the quantity of the stations is 8, the quantity of the resource blocks on the entire channel on which the access point is located is 8 or 16; when the quantity of the stations is 4, the quantity of the resource blocks on the entire channel on which the access point is located is 4, 8, or 16; or when the quantity of the stations is 2, the quantity of the resource blocks on the entire channel on which the access point is located is 2, 4, 8, or 16.

The resource blocks are obtained by means of division according to the quantity of the data subcarriers and the quantity of the resource blocks: When each 20-MHz bandwidth channel includes 192 data subcarriers: when the quantity of the resource blocks is 16, 12 adjacent data subcarriers are allocated to each of the resource blocks; when the quantity of the resource blocks is 8, 24 adjacent data subcarriers are allocated to each of the resource blocks; when the quantity of the resource blocks is 4, 48 adjacent data subcarriers are allocated to each of the resource blocks; or when the quantity of the resource blocks is 2, 96 adjacent data subcarriers are allocated to each of the resource blocks.

When each 20-MHz bandwidth channel includes 208 data subcarriers: when the quantity of the resource blocks is 16, 13 adjacent data subcarriers are allocated to each of the resource blocks; when the quantity of the resource blocks is 8, 26 adjacent data subcarriers are allocated to each of the resource blocks; when the quantity of the resource blocks is 4, 52 adjacent data subcarriers are allocated to each of the resource blocks; or when the quantity of the resource blocks is 2, 104 adjacent data subcarriers are allocated to each of the resource blocks.

A quantity of pilots included in each resource block is determined: When the quantity of the resource blocks is 16, 1 pilot is allocated to each of the resource blocks; when the quantity of the resource blocks is 8, 2 pilots are allocated to each of the resource blocks; when the quantity of the resource blocks is 4, 4 pilots are allocated to each of the resource blocks; or when the quantity of the resource blocks is 2, 8 pilots are allocated to each of the resource blocks.

After the quantity of pilots included in each resource block is determined, a location of a pilot in each resource block is further determined:

When each of the resource blocks includes 12 data subcarriers, a pilot is configured between the resource blocks, where 6 data subcarriers are set on each of two sides of the pilot.

When each of the resource blocks includes 24 data subcarriers, a first pilot and a second pilot are configured, where 12 data subcarriers are set between the first pilot and the second pilot, 6 data subcarriers are set on a side that is of the first pilot and that is far away from the second pilot, and 6 data subcarriers are set on a side that is of the second pilot and that is far away from the first pilot.

When each of the resource blocks includes 26 data subcarriers, a third pilot and a fourth pilot are configured, where 12 data subcarriers are set between the third pilot and the fourth pilot, 7 data subcarriers are set on a side that is of the third pilot and that is far away from the fourth pilot, and 7 data subcarriers are set on a side that is of the fourth pilot and that is far away from the third pilot.

The processor 210 is further configured to allocate, to each of the stations according to the channel estimation information of each of the stations, a resource block for transmitting uplink information;

determine, according to a signal to noise ratio of a station, a quantity of pilots that are needed by the station to transmit the uplink information, and when the signal to noise ratio of the station is less than a preset value, determine that at least 4 pilots are needed by each station to transmit data; or when the signal to noise ratio of the station is not less than a preset value, determine that at least 2 pilots are needed by each station to transmit data.

determine, according to a quantity of pilots that are needed by each of the stations and a quantity of pilots included in the resource block, a target quantity of resource blocks that are needed by each of the stations; and determine that a total quantity of pilots included in the resource block allocated to each station is not less than a quantity of pilots that are needed by the station to transmit data, and a total quantity of resource blocks that are allocated to all stations of the channel is equal to a total quantity of resource blocks included in the channel; and allocate the target quantity of resource blocks to each of the stations.

The transmitter 220 is configured to separately send channel allocation indication information to each of the stations, where the channel allocation indication information is used to indicate information about the resource block allocated to each of the stations, so that each of the stations runs in parallel by using the resource block corresponding to each of the stations.

The embodiments in this specification are all described in a progressive manner, for same or similar parts in the embodiments, reference may be made to these embodiments, and each embodiment focuses on a difference from other embodiments. Especially, apparatus or system embodiments are basically similar to a method embodiment, and therefore are described briefly; for related parts, reference may be made to partial descriptions in the method embodiment. The described apparatus and system embodiments are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

The present invention can be described in the general context of executable computer instructions executed by a computer, for example, a program module. Generally, the program unit includes a routine, program, object, component, data structure, and the like for executing a particular task or implementing a particular abstract data type. The present invention may also be practiced in distributed computing environments in which tasks are performed by remote processing devices that are connected through a communications network. In a distributed computing environment, program modules may be located in both local and remote computer storage media including storage devices.

It should be noted that in this specification, relational terms such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The foregoing descriptions are merely specific implementation manners of the present invention. It should be noted that a person of ordinary skill in the art may make several improvements or polishing without departing from the principle of the present invention and the improvements or polishing shall fall within the protection scope of the present invention.

What is claimed is:

1. An uplink service transmission method for use in an orthogonal frequency division multiple access (OFDMA) system, the method comprising:
   dividing, by a wireless local area network access point according to a quantity of stations connected to the access point, an entire channel on which the access point is located into multiple resource blocks, comprising:
      determining, by the access point according to the quantity of the stations, a quantity of the resource blocks on the entire channel on which the access point is located,
      evenly allocating, by the access point, data subcarriers to each of the resource blocks according to the quantity of the resource blocks and a quantity of the data subcarriers on the entire channel on which the access point is located, and
      allocating, by the access point, a pilot to each of the resource blocks;
   allocating, by the access point to each of the stations according to channel estimation information of the stations, a resource block for transmitting uplink information; and
   separately sending, by the access point, channel allocation indication information to each of the stations for indicating information about the resource block allocated to each of the stations.

2. The method according to claim 1, wherein:
   a quantity of data subcarriers in 256 subcarriers comprised in a 20-MHz channel on which the access point is located comprises 192, 208, or another preset quantity; and
   there are at least 12 data subcarriers between two adjacent pilots.

3. The method according to claim 2, wherein determining, by the access point according to the quantity of the stations, a quantity of the resource blocks on the entire channel on which the access point is located comprises:
   when the quantity of the stations is 8, the quantity of the resource blocks on the entire channel on which the access point is located is 8 or 16;
   when the quantity of the stations is 4, the quantity of the resource blocks on the entire channel on which the access point is located is 4, 8, or 16; or
   when the quantity of the stations is 2, the quantity of the resource blocks on the entire channel on which the access point is located is 2, 4, 8, or 16.

4. The method according to claim 3, wherein on the 20-MHz channel, allocating, by the access point, a pilot to each of the resource blocks comprises:
   when the quantity of the resource blocks is 16, allocating 1 pilot to each of the resource blocks;
   when the quantity of the resource blocks is 8, allocating 2 pilots to each of the resource blocks;
   when the quantity of the resource blocks is 4, allocating 4 pilots to each of the resource blocks; or
   when the quantity of the resource blocks is 2, allocating 8 pilots to each of the resource blocks.

5. The method according to claim 3, wherein evenly allocating, by the access point, data subcarriers to each of the resource blocks according to the quantity of the resource blocks and a quantity of the data subcarriers on the entire channel on which the access point is located comprises:
   when each 20-MHz bandwidth channel comprises 192 data subcarriers:
      when the quantity of the resource blocks is 16, allocating 12 adjacent data subcarriers to each of the resource blocks,
      when the quantity of the resource blocks is 8, allocating 24 adjacent data subcarriers to each of the resource blocks,
      when the quantity of the resource blocks is 4, allocating 48 adjacent data subcarriers to each of the resource blocks, or
      when the quantity of the resource blocks is 2, allocating 96 adjacent data subcarriers to each of the resource blocks; or
   when each 20-MHz bandwidth channel comprises 208 data subcarriers:
      when the quantity of the resource blocks is 16, allocating 13 adjacent data subcarriers to each of the resource blocks,
      when the quantity of the resource blocks is 8, allocating 26 adjacent data subcarriers to each of the resource blocks,
      when the quantity of the resource blocks is 4, allocating 52 adjacent data subcarriers to each of the resource blocks, or
      when the quantity of the resource blocks is 2, allocating 104 adjacent data subcarriers to each of the resource blocks.

6. A wireless local area network access point for use in an orthogonal frequency division multiple access (OFDMA) system, the access point comprising:
   a processor configured to:
      divide, according to a quantity of stations connected to the access point, an entire channel on which the access point is located into multiple resource blocks,
      determine, according to the quantity of the stations, a quantity of the resource blocks on the entire channel on which the access point is located;
      evenly allocate data subcarriers to each of the resource blocks according to the quantity of the resource blocks and a quantity of the data subcarriers on the entire channel on which the access point is located,
      allocate a pilot to each of the resource blocks, and
      allocate, to each of the stations according to channel estimation information of each of the stations, a resource block for transmitting uplink information; and
   a transmitter configured to separately send channel allocation indication information to each of the stations for indicating information about the resource block allocated to each of the stations, to enable each of the stations to run in parallel by using the resource block corresponding to each of the stations.

7. The wireless local area network access point according to claim 6, wherein:
a quantity of data subcarriers in 256 subcarriers comprised in a 20-MHz channel on which the access point is located comprises 192, 208, or another preset quantity; and
there are at least 12 data subcarriers between two adjacent pilots.

8. The wireless local area network access point according to claim 7, wherein the processor is configured to:
when the quantity of the stations is 8, the quantity of the resource blocks on the entire channel on which the access point is located is 8 or 16;
when the quantity of the stations is 4, the quantity of the resource blocks on the entire channel on which the access point is located is 4, 8, or 16; or
when the quantity of the stations is 2, the quantity of the resource blocks on the entire channel on which the access point is located is 2, 4, 8, or 16.

9. The wireless local area network access point according to claim 8, wherein on the 20-MHz channel, the processor is configured to allocate the pilot to each of the resource blocks, and is configured to:
when the quantity of the resource blocks is 16, allocate 1 pilot to each of the resource blocks;
when the quantity of the resource blocks is 8, allocate 2 pilots to each of the resource blocks;
when the quantity of the resource blocks is 4, allocate 4 pilots to each of the resource blocks; or
when the quantity of the resource blocks is 2, allocate 8 pilots to each of the resource blocks.

10. The wireless local area network access point according to claim 8, wherein the processor is configured to evenly allocate the data subcarriers to each of the resource blocks according to the quantity of the resource blocks and the quantity of the data subcarriers on the entire channel on which the access point is located, and is configured to:
when each 20-MHz bandwidth channel comprises 192 data subcarriers:
when the quantity of the resource blocks is 16, allocate 12 adjacent data subcarriers to each of the resource blocks,
when the quantity of the resource blocks is 8, allocate 24 adjacent data subcarriers to each of the resource blocks,
when the quantity of the resource blocks is 4, allocate 48 adjacent data subcarriers to each of the resource blocks, or
when the quantity of the resource blocks is 2, allocate 96 adjacent data subcarriers to each of the resource blocks; or
when each 20-MHz bandwidth channel comprises 208 data subcarriers:
when the quantity of the resource blocks is 16, allocate 13 adjacent data subcarriers to each of the resource blocks,
when the quantity of the resource blocks is 8, allocate 26 adjacent data subcarriers to each of the resource blocks,
when the quantity of the resource blocks is 4, allocate 52 adjacent data subcarriers to each of the resource blocks, or
when the quantity of the resource blocks is 2, allocate 104 adjacent data subcarriers to each of the resource blocks.

11. An uplink service transmission apparatus for use in an orthogonal frequency division multiple access (OFDMA) system, the apparatus comprising:
a processor; and
memory configured to store instructions that, when executed by the processor, cause the apparatus to:
divide, according to a quantity of stations connected to an access point, an entire channel on which the access point is located into multiple resource blocks,
determine, according to the quantity of the stations, a quantity of the resource blocks on the entire channel on which the access point is located,
evenly allocate data subcarriers to each of the resource blocks according to the quantity of the resource blocks and a quantity of the data subcarriers on the entire channel on which the access point is located,
allocate a pilot to each of the resource blocks,
allocate, to each of the stations according to channel estimation information of each of the stations, a resource block for transmitting uplink information, and
separately send channel allocation indication information to each of the stations for indicating information about the resource block allocated to each of the stations, to enable each of the stations to run in parallel by using the resource block corresponding to each of the stations.

12. The apparatus according to claim 11, wherein:
a quantity of data subcarriers in 256 subcarriers comprised in a 20-MHz channel on which the access point is located comprises 192, 208, or another preset quantity; and
there are at least 12 data subcarriers between two adjacent pilots.

13. The apparatus according to claim 12, wherein the instructions, when executed by the processor, cause the apparatus to:
when the quantity of the stations is 8, the quantity of the resource blocks on the entire channel on which the access point is located is 8 or 16;
when the quantity of the stations is 4, the quantity of the resource blocks on the entire channel on which the access point is located is 4, 8, or 16; or
when the quantity of the stations is 2, the quantity of the resource blocks on the entire channel on which the access point is located is 2, 4, 8, or 16.

14. The method according to claim 13, wherein on the 20-MHz channel, the instructions, when executed by the processor, cause the apparatus to:
when the quantity of the resource blocks is 16, allocate 1 pilot to each of the resource blocks;
when the quantity of the resource blocks is 8, allocate 2 pilots to each of the resource blocks;
when the quantity of the resource blocks is 4, allocate 4 pilots to each of the resource blocks; or
when the quantity of the resource blocks is 2, allocate 8 pilots to each of the resource blocks.

15. The apparatus according to claim 14, wherein the instructions, when executed by the processor, cause the apparatus to:
when each 20-MHz bandwidth channel comprises 192 data subcarriers:
when the quantity of the resource blocks is 16, allocate 12 adjacent data subcarriers to each of the resource blocks, when the quantity of the resource blocks is 8, allocate 24 adjacent data subcarriers to each of the resource blocks, when the quantity of the resource blocks is 4, allocate 48 adjacent data subcarriers to each of the resource blocks, or when the quantity of the resource blocks is 2, allocate 96 adjacent data subcarriers to each of the resource blocks; or when each 20-MHz bandwidth channel comprises 208 data subcarriers:

when the quantity of the resource blocks is 16, allocate 13 adjacent data subcarriers to each of the resource blocks, when the quantity of the resource blocks is 8, allocate 26 adjacent data subcarriers to each of the resource blocks, when the quantity of the resource blocks is 4, allocate 52 adjacent data subcarriers to each of the resource blocks, or when the quantity of the resource blocks is 2, allocate 104 adjacent data subcarriers to each of the resource blocks.

\* \* \* \* \*